United States Patent [19]  [11] Patent Number: 4,952,454
Iwamoto et al.  [45] Date of Patent: Aug. 28, 1990

[54] BONDING COMPOSITION FOR CERAMICS COMPRISING METAL OXIDE MELT AND METHOD FOR BONDING CERAMICS

[75] Inventors: Nobuya Iwamoto, Kobe; Norimasa Umesaki, Minoo, both of Japan

[73] Assignee: Sumitomo Cement Co., Ltd., Tokyo, Japan

[21] Appl. No.: 207,620

[22] Filed: Jun. 16, 1988

Related U.S. Application Data

[62] Division of Ser. No. 57,522, filed as PCT JP86/00156 on Mar. 31, 1986, abandoned.

[30] Foreign Application Priority Data

Sep. 30, 1985 [JP] Japan ................................ 60-214864

[51] Int. Cl.$^5$ ............................................. B32B 96/04
[52] U.S. Cl. ...................................... 428/446; 156/89; 428/428; 428/448; 428/450; 428/469; 428/688; 428/697; 428/698; 428/699; 428/702
[58] Field of Search ............... 428/446, 448, 426, 428, 428/450, 469, 633, 688, 689, 697, 698, 699, 702; 156/89

[56] References Cited

U.S. PATENT DOCUMENTS

| | | | |
|---|---|---|---|
| 3,281,309 | 10/1966 | Ross | 156/89 |
| 3,331,731 | 7/1967 | Baak | 428/697 |
| 3,467,510 | 9/1969 | Knochel et al. | 156/89 |
| 3,881,904 | 5/1975 | Stokes et al. | 65/43 |
| 4,347,089 | 8/1982 | Loehman | 156/89 |
| 4,357,382 | 11/1982 | Lambert et al. | 428/698 |
| 4,396,682 | 8/1983 | Mohri et al. | 428/432 |
| 4,469,801 | 9/1984 | Hirai et al. | 428/698 |
| 4,499,147 | 2/1985 | Enomoto et al. | 428/698 |
| 4,689,271 | 8/1987 | Schittenhelm et al. | 428/446 |

FOREIGN PATENT DOCUMENTS

| | | | |
|---|---|---|---|
| 4431102 | 12/1969 | Japan | 501/123 |
| 49-40847 | 11/1974 | Japan | 156/89 |
| 582072 | 11/1977 | U.S.S.R. | 228/175 |

Primary Examiner—Ellis P. Robinson
Assistant Examiner—Archene A. Turner
Attorney, Agent, or Firm—Fleit, Jacobson, Cohn, Price, Holman & Stern

[57] ABSTRACT

A bonding composition comprising a metal oxide melt comprising (a) CaO, (b) $SiO_2$ and/or $Al_2O_3$, and (c) a metal oxide selected from $TiO_2$, $ZrO_2$, $Cr_2O_3$, $HfO_2$, $Nb_2O_3$ and $Ta_2O_5$ is melt-bonded on the surface of a ceramic material, and the ceramic material is bonded to an adherend, if necessary through at least one layer selected from a plating layer, a solder layer, and a buffer layer. In this manner, a strong bonding can be very easily obtained.

6 Claims, 4 Drawing Sheets

4,952,454

BONDING COMPOSITION FOR CERAMICS COMPRISING METAL OXIDE MELT AND METHOD FOR BONDING CERAMICS

This is a divisional of application Ser. No. 057,522 filed as PCT JP86/00156 on Mar. 31, 1986, now abandoned.

TECHNICAL FIELD

The present invention relates to a bonding composition for ceramics and a method for bonding ceramics. More particularly, the present invention relates to a bonding composition which are bond silicon nitride ($Si_3N_4$) to silicon nitride ($Si_3N_4$) or a metal easily and firmly, and a bonding method using this bonding composition.

BACKGROUND ART

Generally, ceramics have excellent heat resistance, corrosion resistance, chemical resistance, hardness, abrasion resistance, and insulating property, and intensive research has been carried out into the use of ceramics as structural parts by utilizing these excellent characteristics.

Silicon nitride ($Si_3N_4$) is a material especially suitable for a part for which a high strength and a high abrasion resistance at high temperature are required, such as a gas turbine rotor or a fan blade liner or for a corrosion-resistant lining member of a chemical reaction tube to be in contact with a molten metal or the like.

But, in the case of ceramics, the integral production of a part having a complicated shape or mechanical processing is still difficult, and since ceramics are inherently brittle materials, the reliability of the strength thereof is inferior to that of metals. Accordingly, the production of products having a complicated shape by bonding ceramic materials or the development of composite structures having both the strength of a metal and the above-mentioned characteristics of a ceramic material by bonding the ceramic material to the metal is desired.

As the method for bonding ceramic materials to each other or bonding a ceramic material to a metal, there are adopted at present a mechanical bonding method such as screwing, shrink fitting or so-called fitting, an adhesive method using an organic or inorganic adhesive, a solder method in which the surface of a ceramic material is metallized and bonding is effected by using a solder, and a solid phase diffusion method in which bonding is effected at a high temperature under direct compression or through an insert. When a ceramic material is bonded to a metal according to the solid phase diffusion method, a flexural bonding strength of at least 100 MPa and occasionally 500 MPa (which is equal to the strength of the ceramic material per se) is obtained, and the residual stress generated by the difference of the thermal expansion coefficient is moderated by an insert interposed between the ceramic material and metal. Accordingly, the characteristics of the ceramic material and metal can be exerted most effectively in the solid phase diffusion method. Nevertheless, in the solid phase diffusion method, since a hot isostatic pressing (HIP) or a hot pressing (HP) must be used, the cost is increased. According to the solder bonding method, a metal layer is formed between a ceramic material and an adherend and the assembly is heated to fuse the metal layer and effect bonding. The strength and air tightness of the bonded portion are excellent and the bonding operation can be easily accomplished. In the case where a ceramic material is bonded to a metal or ceramic materials are bonded together according to this method, the surface of the ceramic material must be metallized, and as the wetting property of this metallized layer with the ceramic material is high, the bonding work quantity of the interface is increased and a strong bonding layer can be obtained.

But, since silicon nitride has a stron covalent bonding property, the affinity with a melt, that is, the wettability, is low. Furthermore, silicon nitride has a low reactivity with various substances. Therefore, a good metallized layer cannot be formed, and it is difficult to bond a ceramic material to a metal or ceramic materials to each other easily and firmly.

In view of the foregoing defects of the conventional techniques, it is a primary object of the present invention to provide a bonding composition capable of bonding ceramic materials such as silicon nitride ($Si_3N_4$) to each other or bonding a ceramic material to a metal easily and firmly, and a bonding method using this bonding composition.

DISCLOSURE OF THE INVENTION

In accordance with one aspect of the present invention, there is provided a bonding composition for bonding a ceramic material to an adherend, which comprises a metal oxide melt comprising (a) CaO, (b) at least one metal selected from the group consisting of $SiO_2$ and $Al_2O_3$, and (c) at least one metal oxide selected from the group consisting of $TiO_2$, $ZrO_2$, $Cr_2O_3$, $MfO_2$, $Nb_2O_5$, and $Ta_2O_5$.

In accordance with another aspect of the present invention, there is provided a method for bonding ceramics, which comprises melt-bonding the above-mentioned bonding composition to the surface of a ceramic material and bonding the ceramic material to an adherend, if necessary through at least one layer selected from the group consisting of a plating layer, a solder layer, and a buffer layer.

BEST MODE FOR CARRYING OUT THE INVENTION

Figure 1:
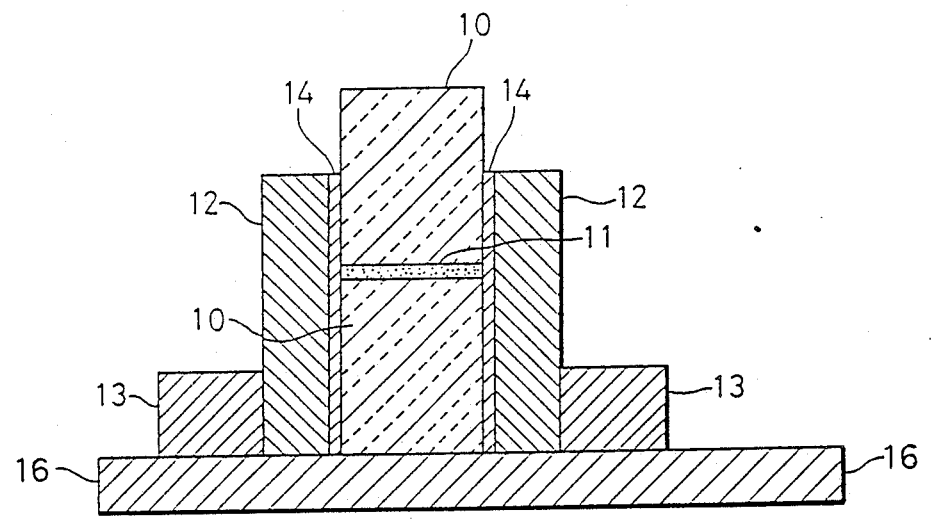
FIG. 1 is a sectional view showing the state wherein ceramic materials are bonded together according to the bonding method of the present invention.

The bonding composition of the present invention is prepared by weighing, mixing, and pulverizing predetermined amounts of three starting components (a), (b), and (c), that is, (a) CaO, (b) $SiO_2$ and/or $Al_2O_3$, and (c) at least one metal oxide selected from $TiO_2$, $ZrO_2$, $HfO_2$, $Nb_2O_5$, $Ta_2O_5$, and $Cr_2O_3$, calcining the mixture at a high temperature at 1,300° to 1,500° C., and pulverizing the calcined product to form a fine powder having a uniform composition, or using the uncalcined mixture as the powdery composition. In order to form a uniform reaction phase on the surface of silicon nitride, preferably the fine powder is composed of fine particles having a particle size smaller than 44 μm.

The ratio of the three components (a), (b), and (c) constituting the metal oxide melt is preferably such that the metal oxide melt comprises 30 to 70% by weight of the component (a), 10 to 50% by weight of the component (b), and 5 to 60% by weight of the component (c).

In bonding ceramic materials such as silicon nitride to each other, or bonding a ceramic material to a metal by using the bonding composition of the present invention, the bonding composition in the form of a fine powder is first mixed with an organic binder to form a paste. Commercially available screen oil or ethyl cellulose is preferably used as the binder. Then, the paste is coated or thick-printed in a predetermined thickness on the surface of silicon nitride ($Si_3N_4$), and the applied paste is sufficiently dried at 100° to 200° C. and calcined at 1,300° to 1,600° C. for 10 to 60 minutes. As the bonding atmosphere, there are ordinarily used atmospheric pressure $N_2$ gas, $H_2$-$N_2$ mixed gas, compressed $N_2$ gas, and inert gas (such as Ar gas). When silicon nitride articles are bonded together, an oxidizing atmosphere may be adopted. Note, the above-mentioned calcination temperature and time were determined so as to obtain an air-tight bonding intermediate layer.

The present invention will now be described in detail with reference to embodiments wherein the $CaO$—$SiO_2$—$TiO_2$ or $CaO$—$Al_2O_3$—$TiO_2$ system is used as a typical instance of the metal oxide melt (sometimes referred to as "solder" hereinafter).

In the case where the solder used in the bonding method of the present invention has a composition of $CaO$—$SiO_2$—$TiO_2$, in order to prevent the occurrence of phenomena inhibiting the bonding of ceramics, caused by a chemical reaction in the bonding interface, such as blowing and uneven calcination, preferably the composition should comprise 30 to 60% by weight of CaO, 15 to 45% by weight of $SiO_2$ and 10 to 40% by weight of $TiO_2$. Namely, if the composition is within the above-mentioned range, the viscosity of the melt is low and a reaction gas generated during the chemical reaction described below is sufficiently discharged and transpired, and $SiO_2$ formed as a by-product is absorbed as a component of the melt. For example, it was confirmed that a composition comprising 35 mole% of CaO, 35 mole% of $SiO_2$, and 30 mole% of $TiO_2$ (30.4% by weight of CaO, 37.1% by weight of $SiO_2$ and 32.5% by weight of $TiO_2$) has a good wettability.

Namely, $TiO_2$ in the solder in the molten state at the calcination temperature undergoes the following dissociation:

$$TiO_2 \rightarrow Ti^{4+} + 2O^{2-} \tag{1}$$

In this case, $O^{2-}$ breaks the network structure of $SiO_2$ and makes no contribution to the chemical reaction. $Ti^{4+}$ reacts in the interface with nitrogen in the nascent state, produced by decomposition of $Si_3N_4$, to cause precipitation of TiN, as indicated below:

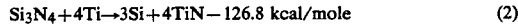
$$Si_3N_4 + 4Ti \rightarrow 3Si + 4TiN - 126.8 \text{ kcal/mole} \tag{2}$$

$$3Si + 3O \rightarrow 3SiO(g)q \tag{3}$$

TiN thus precipitated is accumulated at a highest concentration in the interface of $Si_3N_4$ but is little diffused in the interior of $Si_3N_4$. $SiO_2$ formed as the by-product is absorbed in the solder while SiO is transpired.

Figure 4:
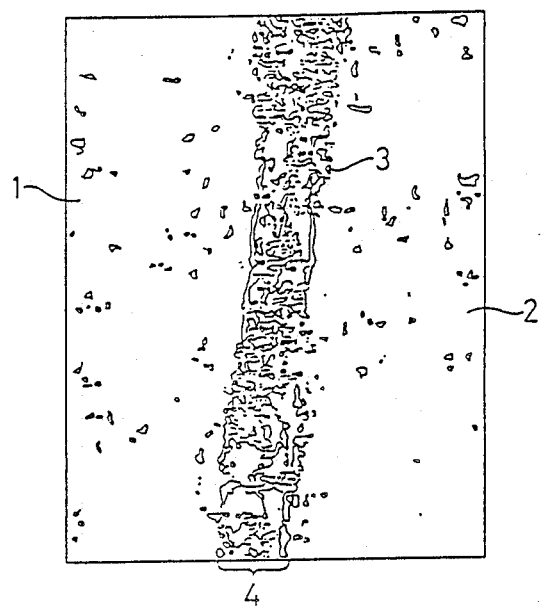
FIGS. 4 and 5 are diagrams showing the results of SEM-EPMA analysis of the bonded portion formed by bonding ceramic materials to each other according to the bonding method of the present invention.
Figure 5:
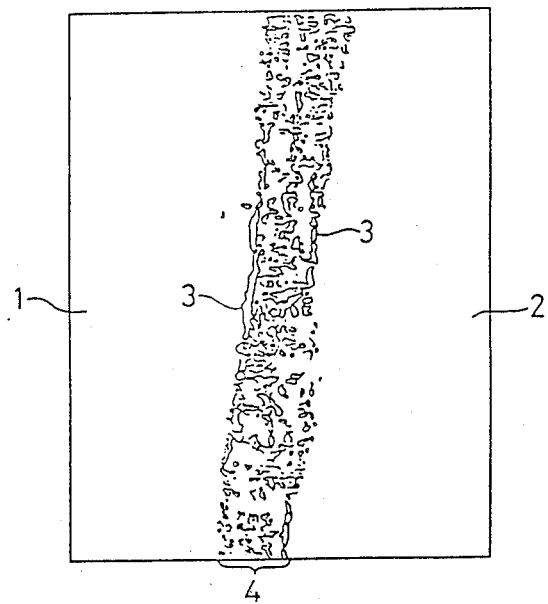
Figure 6:
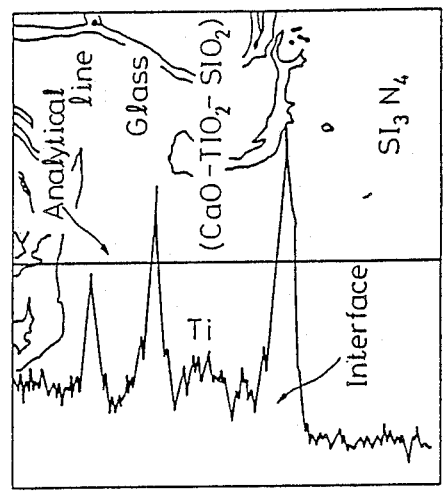
FIG. 6 is a diagram showing the results of EPMA analysis of the bonded portion.

Since TiN precipitated in the foregoing manner has a very high alignment with silicon nitride ($\beta$-$Si_3N_4$), from the crystallochemical viewpoint, a very dense intermediate layer is formed. Accordingly, when the solder of the present invention is used for bonding, a very high bonding strength can be obtained. Note, FIGS. 4 and 5 show the results of SEM-EPMA analysis of the product obtained by bonding a ceramic article 1 to a ceramic article 2 according to the bonding method of the present invention. FIG. 6 shows the results of a similar EPMA analysis. It is seen that TiN coheres in the bonding interface 3 between ceramics ($Si_3N_4$) 1 and 2 to form a bonding layer 4. When the accumulation degree of TiN in the bonding boundary of $Si_3N_4$ is determined by analysis of the SEM-EPMA images shown in FIGS. 4 and 5, it is confirmed that 36.8% by weight of all of TiN present in the bonding layer 4 is accumulated in a thickness of 2 μm in the bonding interface 3 between ceramics ($Si_3N_4$) 1 and 2. In this embodiment, the thickness of the bonding intermediate layer is 25 μm, and TiN is condensed at a concentration of at least 3 times in the boundary portion. Namely, in the present invention, the solder component such as Ti, Zr or Cr is concentrated and precipitated in the bonding boundary between ceramics ($Si_3N_4$).

In the case where the metal oxide melt has a composition of $CaO$—$Al_2O_3$—$TiO_2$, in order to obtain a good bonding state, preferably the composition should comprise 30 to 70% by weight of CaO, 10 to 50% by weight of $Al_2O_3$, and 10 to 40% by weight of $TiO_2$.

In the case of the composition of $CaO$—$SiO_2$—$TiO_2$, the composition of the melt of the intermediate layer, from which TiN precipitated with the advance of the reaction in the interface of $Si_3N_4$ is removed, contains $SiO_2$ at a content higher than the starting composition and $TiO_2$ at a content lower than in the starting composition and the composition consists of calcium silicate titanate in which impurities in $Si_3N_4$ have been absorbed. On the other hand, in the case of the $CaO$—$Al_2O_3$—$TiO_2$ system, the solder is transformed to a four-component composition including $SiO_2$ formed as the by-product, in addition to the above-mentioned three components.

From this fact, it is seen that the present invention can be applied to a composition comprising at least for components, formed by combining solder compositions comprising three components.

In the case where $Si_3N_4$ (which comprises particles having a particle size smaller than 10 μm at a content of at least 97% by weight based on the total particles and has an α-content of at least 90% by weight) is added to the fine solder powder, the bonding strength can be further increased. This effect is observed when the composition comprises 90 to 15% by weight of the fine solder powder and 10 to 85% by weight of powder $Si_3N_4$, and a highest effect is obtained when the content of the solder is about 60% by weight and the content of $Si_3N_4$ is about 40% by weight, although the optimum ratio differs to some extent according to the composition of the fine solder powder. It is considered that by incorporating $Si_3N_4$ into the bonding layer, the thermal expansion coefficient of the bonding layer is brought close to that of an $Si_3N_4$ sintered body, and the residual strain in the bonding layer after the bonding is reduced.

In the case where bonding of a ceramic material such as $Si_3N_4$ to a metal is intended, after coating and calcination of the solder paste, Ni is plated on the obtained layer to improve the wettability at the soldering, and bonding is accomplished by using a solder.

If a powder of a metal having a relatively high melting point, such as W, Mo, Nb, Cr, Ti, V, Zr or Mn or an alloy thereof is added when preparing the solder paste, the soldering strength after the metallization can be further increased. Although the amount of the metal added is changed according to the composition of the solder, the high-melting-point metal or alloy powder is generally added in an amount of 5 to 95% by weight based on the sum of the solder and the high-melting-point metal or alloy powder, and a highest effect is attained if the amount of the high-melting-point metal or alloy powder added is about 30% by weight. The high-melting-point metal or allow powder may be a metal mixture or alloy powder containing 75 to 95% by weight of W or Mo and 5 to 25% by weight of Mn.

In the case where a ceramic material such as $Si_3N_4$ is bonded to a metal, thereby may be adopted a two-layer structure in which the bonding layer contiguous to $Si_3N_4$ is composed of the solder and the layer contiguous to the metal is a mixture composed of at least one metal selected from the above-mentioned metals and the solder. In this embodiment, the solder paste is coated or thick-printed on the surface of $Si_3N_4$ and dried at 100° to 200° C., a mixed paste of the fine solder powder and the high-melting-point metal is then coated, and the upper and two layers are integrally calcined.

In this embodiment, preferably the mixing ratio between the fine solder powder and the metal component is such that, as calculated in the state where the fine solder powder is molten, the content of the fine solder powder is 5 to 20% by weight and the content of the high-melting-point metal is 95 to 80% by weight. This mixing ratio is necessary and sufficient for filling spaces in the metal component with the melt of the solder during the high-temperature calcination and integrating the mixture layer with the solder melt of the layer contiguous to $Si_3N_4$.

In this embodiment, as in the case of bonding $Si_3N_4$ to $Si_3N_4$, calcination is carried out at 1,300° to 1,600° C., preferably 1,450° to 1,550° C., for 10 to 60 minutes, normally in an atmospheric pressure $N_2$ atmosphere. In the case where ceramic materials are bonded together, calcination may be carried out in $H_2+N_2$ mixed gas, inert gas (for example, Ar gas) or compressed $N_2$ gas, but in the case where $Si_3N_4$ is bonded to a metal, an oxidizing atmosphere such as air is not suitable. Although the calcination temperature is changed to some extent according to the composition of the fine solder powder, the calcination temperature is ordinarily a temperature at which a melt is formed on the surface of $Si_3N_4$, and the calcination time is a time necessary for forming an air-tight bonding intermediate layer by reaction of the melt with $Si_3N_4$ on the surface of $Si_3N_4$.

The present invention will now be described in detail with reference to the following examples.

EXAMPLE 1

Bonding of Ceramic Material ($Si_3N_4$) to Ceramic Material ($Si_3N_4$)

Calcium carbonate ($CaCO_3$), silicic anhydride ($SiO_2$), and titanium oxide ($TiO_2$) were weighed so that a composition shown in Table 1 was obtained, and were wet-pulverized for 3 hours in a centrifugal rotation type agate ball mill. The pulverization product was dried at 100° C. for 24 hours and the obtained fine solder powder was mixed with commercially available screen oil to form a solder paste. The solder paste was thick-printed on the surface of a ceramic articles ($Si_3N_4$) having a size of 15 mm×30 mm×5 mm to form an adhesive layer 11 of a solder of a metal oxide melt solder of $CaO$—$SiO_2$—$TiO_2$. The sample was dried at 200° C. for 6 hours. Two of the ceramic articles ($Si_3N_4$) 10 having the solder adhesive layer 11 were piled so that the solder adhesive layers are placed in close contact with each other as shown in FIG. 1. The assembly having a structure shown in FIG. 1 was calcined at a calcination temperature of 1,500° C. for 20 minutes in an atmospheric pressure $N_2$ atmosphere or compressed $N_2$ atmosphere. Note, in FIG. 1, reference numeral 12 represents a first supporting plate formed of carbon (graphite), reference numeral 13 represents a supporting plate formed of $Al_2O_3$, reference numeral 16 represents a second supporting plate formed of $Al_2O_3$, and reference numeral 14 represents an organic adhesive used for bonding the carbon (graphite) supporting plate to the ceramic article 10.

Several test pieces having a size of 3 mm×4 mm×40 mm were cut from the calcined integrated sample, and the 4-point (three equal portions) bending strength test was carried out at a cross head speed of 0.5 mm/min and a span length of 30 mm. The obtained results are shown in Table 1. Note, the thickness of the bonding intermediate layer was 20 to 30 μm.

For comparison, ceramic articles ($Si_3N_4$) were bonded by using an oxide solder ($CaO$—$MgO$—$Al_2O_3$ system), and the strength test was carried out in the same manner as described above. The obtained results are shown in the lower portion of Table 1.

TABLE 1

| Run No. | Paste Composition (% by weight) | | | 4-Point Bending Strength ($kg/mm^2$) | |
|---|---|---|---|---|---|
| | CaO | $SiO_2$ | $TiO_2$ | Atmospheric Pressure $N_2$ Atmosphere | Compressed (5 $kg/cm^2$) $N_2$ Atmosphere |
| 1 | 30 | 30 | 40 | 12.3 | 13.1 |
| 2 | 35 | 35 | 30 | 14.5 | 14.9 |
| 3 | 35 | 40 | 25 | 15.2 | 15.0 |
| 4 | 35 | 25 | 40 | 10.5 | 12.1 |
| 5 | 45 | 45 | 10 | 19.7 | 21.3 |
| 6 | 45 | 35 | 20 | 25.0 | 37.4 |
| 7 | 45 | 25 | 30 | 18.3 | 18.9 |
| 8 | 60 | 30 | 10 | 13.1 | 12.6 |
| 9 | 60 | 15 | 25 | 11.8 | 12.1 |
| Comparative Run No. | CaO | MgO | $Al_2O_3$ | Atmospheric Pressure $N_2$ Atmosphere | Compressed (5 $kg/cm^2$) $N_2$ Atmosphere |
| 1 | 20 | 30 | 50 | 7.5 | 7.2 |
| 2 | 30 | 60 | 10 | 6.8 | 7.3 |
| 3 | 50 | 10 | 40 | 4.8 | 5.4 |

EXAMPLE 2

Bonding of Ceramic Material ($Si_2N_4$) to Ceramic Material ($Si_3N_4$)

To the fine solder powder of Run No. 6 in Table 1 of Example 1 was added 10 to 80% by weight of powdery α-$Si_3N_4$ containing particles having a particle size smaller than 10 μm in an amount of at least 97% by weight based on the total particles, and a paste was prepared from the mixture. In the same manner as described in Example 1, calcination was carried out at 1,500° C. for 30 minutes in an atmospheric pressure $N_2$ atmosphere. After the calcination, test pieces having a size of 3 mm×4 mm×40 mm were cut from the sample and the strength test was carried out in the same manner as described in Example 1. The obtained results are shown in Table 2.

TABLE 2

| Run No. | Solder/Si$_3$N$_4$ Weight Ratio in Paste | | 4-Point Bending Strength (kg/mm$^2$) |
|---|---|---|---|
| | Solder | Si$_3$N$_4$ Powder | N$_2$ Atmosphere |
| 2-1 | 90 | 10 | 25.5 |
| 2-2 | 70 | 30 | 26.7 |
| 2-3 | 60 | 40 | 28.5 |
| 2-4 | 50 | 50 | 27.3 |
| 2-5 | 40 | 60 | 26.0 |
| 2-6 | 20 | 80 | 25.2 |

EXAMPLE 3

Figure 2:
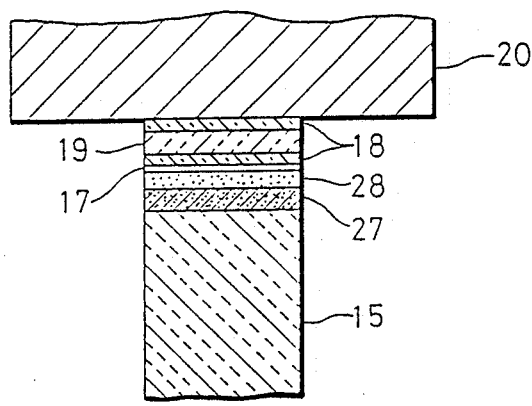
FIG. 2 is a sectional view showing the state wherein a ceramic material is bonded to a metal according to the bonding method of the present invention.

Bonding of Ceramic Material (Si$_3$N$_4$) to Metal Calcium carbonate (CaCO$_3$) silicic anhydride (SiO$_2$) and titanium oxide (TiO$_2$) were weighed so that a composition of Run No. 6 in Table 1 of Example 1 was obtained, and the mixture was melted at 1,500° C. for 60 minutes in a platinum crucible and wet-pulverized for 3 hours in an agate ball mill to obtain a fine solder powder. The fine powder was mixed with screen oil to form a paste 27. As shown in FIG. 2, the paste was coated on the surface of an article 15 of Si$_3$N$_4$ having a size of 15 mm×20 mm×5 mm and was dried at 200° C. for 3 hours. Then, a mixed paste comprising the above-mentioned fine solder powder and a powder of a metal or alloy of W, Mo, Cr, Ti, W-Mn, Mo-Mn or Mo-Cr was coated on the above-mentioned paste layer to form a metallized adhesive layer 28, and the coated layer was dried at 200° C. for 3 hours and calcination was carried out at 1,500° C. for 30 minutes at an atmosphere pressure N$_2$ atmosphere. An electroless Ni plating layer 17 having a thickness of about 2 μm was formed on the so-obtained metallized adhesive layer 28. Two silver solder (BAg-8) layer 18 specified in JIS (Japanese Industrial Standard) and each having a thickness of 0.1 mm, were formed on and below a buffer member 19 formed of a Cu plate having a thickness of 2 mm. The silver-coated Cu buffer member was placed on the plating layer 17. A plate 20 of S45C steel was further piled and heat soldering was carried out at 790° C. for 10 minutes. The results of the shear strength test are shown in Table 3.

TABLE 3

| Run No. | Metal Powder and Composition (weight ratio) | Solder/Metal Ratio in Paste | | Shear Strength (kg/mm$^2$) |
|---|---|---|---|---|
| | | Solder (% by weight) | Metal Powder (% by weight) | |
| 3-1 | W | 5 | 95 | 2.91 |
| 3-2 | W | 10 | 90 | 4.01 |
| 3-3 | W | 20 | 80 | 3.70 |
| 3-4 | Mo | 10 | 90 | 4.13 |
| 3-5 | Cr | 10 | 90 | 4.95 |
| 3-6 | Ti | 10 | 90 | 5.01 |
| 3-7 | W-Mn (8:2) | 10 | 90 | 6.51 |
| 3-8 | Mo-Mn (8:2) | 10 | 90 | 6.48 |
| 3-9 | Mo-Cr (8:2) | 10 | 90 | 6.21 |

EXAMPLE 4

Bonding of Ceramic Material (Si$_3$N$_4$) to Metal

Figure 3:
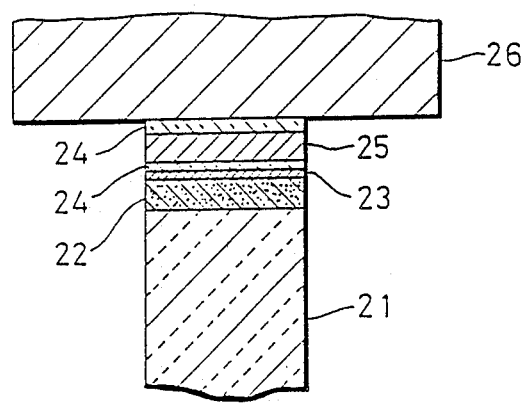
FIG. 3 is a sectional view showing the state wherein a ceramic material is similarly bonded to a metal according to the bonding method of the present invention.

Calcium carbonate (CaCO$_3$), silicic anhydride (SiO$_2$) and titanium oxide (TiO$_2$) were weighed so that a composition of Run No. 6 in Table 1 of Example 1 was obtained, and the powdery mixture was melted at 1,500° C. for 60 minutes in a platinum crucible and wet-pulverized for 3 hours in an agate ball mill to obtain a fine solder powder. To the powder was added 5 to 50% by weight of a metal powder of V, Zr, Nb or W—Mn, and the mixture was mixed with screen oil to form a paste. As shown in FIG. 3, the paste was coated on the surface of an article 21 of Si$_3$N$_4$ having a size of 15 mm×30 mm×5 mm and dried at 200° C. for 3 hours. Then, calcination was carried out in atmospheric pressure N$_2$ gas at a temperature suitable for the composition, which was selected in range of from 1,450° to 1,600° C.

An Ni plating layer 23 having a thickness of about 2 μm was formed on the so-obtained metallized adhesive layer 22 comprising the CaO—SiO$_2$—TiO$_2$ solder as the metal oxide and the metal powder. Silver solder (BAg-8) layers 24 specified in JIS and each having a thickness of 0.1 mm, were formed on and below a buffer member 25 composed of a Cu plate having a thickness of 2 mm. The silver-coated Cu buffer member was placed on the plating layer 23. Then, an S45C steel plate 26 was further piled and heat soldering was carried out at 790° C. for 10 minutes. The results of the shear strength test are shown in Table 4.

TABLE 4

| Run No. | Metal Powder and Composition (weight ratio) | Solder/Metal Ratio in Paste | | Calcination Temperature (°C.) | Calcination Time (minutes) | Shear Strength (kg/mm$^2$) |
|---|---|---|---|---|---|---|
| | | Solder (% by weight) | Metal Powder (% by weight) | | | |
| 4-1 | V | 90 | 10 | 1,450 | 30 | 4.95 |
| 4-2 | Zr | 90 | 10 | 1,450 | 30 | 5.27 |
| 4-3 | Nb | 90 | 10 | 1,600 | 60 | 4.78 |
| 4-4 | W—Mn (8:2) | 95 | 5 | 1,500 | 30 | 3.47 |
| 4-5 | W—Mn (8:2) | 90 | 10 | 1,500 | 30 | 4.57 |
| 4-6 | W—Mn (8:2) | 70 | 30 | 1,500 | 30 | 5.48 |
| 4-7 | W—Mn (8:2) | 50 | 50 | 1,500 | 30 | 4.21 |

EXAMPLE 5

Bonding of Ceramic Material (Si$_3$N$_4$) to Metal

With respect to the sample of Run No. 3-7 in Table 3 of Example 3, metallization and plating were carried out in the same manner as described in Example 3. Silver solder (BNi-5) layers specified in JIS and each having a thickness of 0.1 mm, were formed on and below a buffer member composed of an Ni plate having a thickness of 2 mm. The silver-coated Ni buffer member was placed on the plating layer, and a plate of S45C steel was piled thereon. Heat soldering was carried out at 1,200° C. for 10 minutes. The hot shear strength test of the bonded structure was carried out at normal temperature, 500° C., 700° C., and 850° C. The obtained results are shown in Table 5.

For comparison, metallization was carried out by using a silver-copper eutectic solder comprising 70% by weight of Ag, 20% by weight of Cu, and 10% by weight of Ti, and a bonded structure was prepared in the same manner as described above. The hot shear strength test of the bonded structure was carried out at the above-mentioned temperatures. The obtained results are shown in Table 5.

TABLE 5

| Test Temperature (°C.) | Shear Strength (kg/mm$^2$) | |
| --- | --- | --- |
|  | Present Invention | Comparison |
| Ambient temperature | 6.61 | 7.21 |
| 500 | 5.80 | 5.04 |
| 700 | 4.71 | 2.57 |
| 850 | 4.00 | Measurement impossible |

CAPABILITY OF EXPLOITATION IN INDUSTRY

In the bonding composition of the present invention, a metallized layer is formed by the metal oxide melt and bonding is accomplished by heat-melting the metallized layer. Accordingly, the metallized layer can be formed in a good state on the surface of a ceramic material having fine pores and a low wettability and, therefore, bonding of ceramic materials to each other or bonding of a ceramic material to a metal can be easily accomplished by the soldering method.

Furthermore, $TiO_2$ in the metal oxide melt precipitates TiN at the calcination temperature, and this TiN is accumulated at a high concentration in the interface of the ceramic material ($Si_3N_4$) to form a dense intermediate layer. Therefore, ceramic materials ($Si_3N_4$) can be bonded together, or a ceramic material ($Si_3N_4$) can be bonded to a metal.

We claim:

1. A ceramic body composed of a silicon nitride substrate member and adhered member composed of silicon nitride or a metal, which are bonded via an interposed bonding composition comprising, based on the weight of the bonding composition, 5 to 95% by weight of a metal oxide bonding composition and 5 to 95% by weight of a high-melting-point metal or high-melting-point alloy; said metal oxide bonding composition consisting of, based on the weight of the metal oxide bonding composition, (a) 30 to 70% by weight of CaO, (b) 10 to 50% by weight of at least one oxide selected from the group consisting of $SiO_2$ and $Al_2O_3$ and (c) 5 to 60% by weight of $TiO_2$.

2. A ceramic body as set forth in claim 1, wherein the high-melting-point melt or high-melting-point alloy is at least one member selected from the group consisting of W, Mo, Nb, Cr, Ti, V, Zr, Mn and alloys thereof.

3. A ceramic body as set forth in claim 1, wherein the high-melting-point metal or high-melting-point alloy is a metal mixture of alloy comprising 75 to 95% by weight of W and 5 to 25% by weight of Mn.

4. A ceramic body as set forth in claim 1, wherein the high-melting-point metal or high-melting-point alloy is a metal mixture or alloy comprising 75 to 95% by weight of Mo and 5 to 25% by weight of Mn.

5. A ceramic body composed of a silicon nitride substrate member and adhered member composed of silicon nitride or a metal, which are bonded via an interposed bonding composition comprising, based on the weight of the bonding composition, 15 to 90% by weight of a metal oxide bonding composition and 10 to 85% by weight of silicon nitride; said metal oxide bonding composition consisting of, based on the weight of the metal oxide bonding composition, (a) 30 to 70% by weight of CaO, (b) 10 to 50% by weight of at least one oxide selected from the group consisting of $SiO_2$ and $Al_2O_3$ and (c) 5 to 60% by weight of $TiO_2$.

6. A ceramic body as set forth in claim 1, wherein the component (b) is $SiO_2$ and the adhered member is composed of a metal.

* * * * *

UNITED STATES PATENT AND TRADEMARK OFFICE
CERTIFICATE OF CORRECTION

PATENT NO.   :   4,952,454

DATED        :   August 28, 1990

INVENTOR(S)  :   Nobuya IWAMOTO et al.

It is certified that error appears in the above-identified patent and that said Letters Patent is hereby corrected as shown below:

On the title page, in item [62], ", abandoned" should be deleted.

Signed and Sealed this

Seventh Day of April, 1992

Attest:

*Attesting Officer*

HARRY F. MANBECK, JR.

*Commissioner of Patents and Trademarks*